United States Patent
Jeon et al.

(10) Patent No.: US 12,528,057 B2
(45) Date of Patent: Jan. 20, 2026

(54) HOLLOW FIBER COMPOSITE MEMBRANE FOR WATER VAPOR SEPARATION, METHOD FOR MANUFACTURING THE SAME, AND DEVICE INCLUDING THE SAME

(71) Applicants: KOREA INSTITUTE OF ENERGY RESEARCH, Daejeon (KR); KOREA INSTITUTE OF SCIENCE AND TECHNOLOGY, Seoul (KR)

(72) Inventors: Jae Deok Jeon, Daejeon (KR); Soon Jin Kwon, Daejeon (KR); Won Kil Choi, Daejeon (KR); So Jung Park, Seoul (KR)

(73) Assignees: KOREA INSTITUTE OF ENERGY RESEARCH, Daejeon (KR); KOREA INSTITUTE OF SCIENCE AND TECHNOLOGY, Seoul (KR)

(*) Notice: Subject to any disclaimer, the term of this patent is extended or adjusted under 35 U.S.C. 154(b) by 516 days.

(21) Appl. No.: 17/988,514

(22) Filed: Nov. 16, 2022

(65) Prior Publication Data

US 2024/0075432 A1    Mar. 7, 2024

(30) Foreign Application Priority Data

Sep. 6, 2022    (KR) .................. 10-2022-0112833

(51) Int. Cl.
| | |
|---|---|
| *B01D 69/12* | (2006.01) |
| *B01D 67/00* | (2006.01) |
| *B01D 69/02* | (2006.01) |
| *B01D 69/08* | (2006.01) |

(52) U.S. Cl.
CPC ..... *B01D 69/1251* (2022.08); *B01D 67/0088* (2013.01); *B01D 69/02* (2013.01); *B01D 69/08* (2013.01); *B01D 2323/12* (2013.01); *B01D 2323/21813* (2022.08); *B01D 2325/30* (2013.01)

(58) Field of Classification Search
CPC ........... B01D 69/1251; B01D 67/0081; B01D 67/0088
See application file for complete search history.

(56) References Cited

U.S. PATENT DOCUMENTS

2007/0022877 A1* 2/2007 Marand ............... B01J 31/1805
                                                            95/51

OTHER PUBLICATIONS

An et al. (Journal of Industrial and Engineering Chemistry, 59, 2018, p. 259-265) "Development of thin film nanocomposite membranes incorporated with sulfated b-cyclodextrin for water vapor/N2 mixture gas separation" (Year: 2018).*

(Continued)

*Primary Examiner* — Ryan B Huang
(74) *Attorney, Agent, or Firm* — Birch, Stewart, Kolasch & Birch, LLP

(57) ABSTRACT

Provided are a hollow fiber composite membrane for water vapor separation, comprising a hollow fiber membrane including two or more pores and a coating layer in which an interfacial polymer obtained from interfacial polymerization of water-soluble monomer and an organic monomer is coated on a surface of the hollow fiber membrane, and a chemical resistant substance is introduced in the interfacial polymer, and a method for manufacturing the same.

2 Claims, 12 Drawing Sheets

(56) References Cited

OTHER PUBLICATIONS

An et al. (Journal of Membrane Science, 531, 2017, p. 77-85) "Enhancement of water vapor separation using ETS-4 incorporated thin film nanocomposite membranes prepared by interfacial polymerization" (Year: 2017).*

An et al. (Journal of Industrial and Engineering Chemistry, 59, 2018, 259-265). "Development of thin film nanocomposite membranes incorporated with sulfated b-cyclodextrin for water vapor/N2 mixture gas separation" (Year: 2018).*

An et al., "Enhancement of water vapor separation using ETS-4 incorporated thin film nanocomposite membranes prepared by interfacial polymerization," Journal of Membrane Science, vol. 531, Jun. 1, 2017, pp. 77-85.

Ang et al., "Surface Properties, Free Volume, and Performance for Thin-Film Composite Pervaporation Membranes Fabricated through Interfacial Polymerization Involving Different Organic Solvents.," Polymers, 2020, pp. 1-14.

* cited by examiner

HOLLOW FIBER COMPOSITE MEMBRANE FOR WATER VAPOR SEPARATION, METHOD FOR MANUFACTURING THE SAME, AND DEVICE INCLUDING THE SAME

CROSS-REFERENCE TO RELATED APPLICATIONS

This application claims priority from Korean Patent Application No. 10-2022-0112833, filed on Sep. 6, 2022, which is hereby incorporated by reference for all purposes as if fully set forth herein.

BACKGROUND

Field

The disclosure relates to a hollow fiber composite membrane for water vapor separation, a method for manufacturing the same, and a device including the same.

Description of Related Art

Among hydrocarbons, volatile organic compounds (VOCs) are petrochemical products, organic solvents, or other substances with a reid vapor pressure of 10.3 kilopascals or more (where, the reid vapor pressure is the pressure of a mixture in the gas phase when the vapor volume of the mixture is 4 times the liquid volume at 37.8° C.). VOCs collectively refer to all organic substances that exist in the gas phase at room temperature and room pressure. VOCs may be harmful even by their own nature and may act as a precursor to form photochemical oxides as secondary pollutants, such as ozone that is harmful to humans and animals and plants, by photochemical reaction with nitrogen oxides (NOx) in the atmosphere. As the industry develops rapidly, the usage and release of organic solvents used are also increasing, so urgent management of VOCs is needed.

According to pollutant release and transfer register (PRTR), eleven types of VOC-applied substances are used in significantly large quantities in industry, which are air pollutants very toxic and hazardous to human health. Among these substances, toluene has as large an influence as it is used in every industry sector. Therefore, if a technique for reducing toluene is developed, it may be applied to all industries and is expected to have a large ripple effect.

VOCs are emitted in most industries, but among them, painting facilities are emitting so much that they account for about 34% of the total amount of VOCs in Korea. VOCs generated from painting facilities are characterized by containing dust and water vapor, and they react with other substances in the discharge process to generate secondary pollutants. In particular, since most of the painting booth processes adopt a wet cleaning method at the bottom, the exhaust gas containing VOCs exhibits relatively high humidity of 70% or more.

Even in general painting factories that do not adopt the wet cleaning method, the VOC-containing gas contains much water vapor as the humidity in Korea is very high— 67% as the average annual relative humidity in Korea and 74% in the summer season (60% in spring/fall). This water vapor ingress directly affects the efficiency of the VOCs recovery and treatment facility at the rear of the painting booth. A report has it that water vapor ingress increases exhaust gas treatment while relatively diluting and decreasing the concentration of VOCs and causes competitive mutual action between the water molecules of the water vapor and the VOCs or detachment of the VOCs molecules from the surface of the treatment material by the water vapor to reduce VOCs removal efficiency. Hence, it is needed to properly adjust water vapor by adopting water vapor pretreatment process so as to enhance VOCs efficiency and reduce processing costs.

Among water vapor treatment methods, membrane treatment methods have recently been vigorously researched. Since it applies only reduced pressure to the membrane, the membrane treatment method provides advantages, such as low energy consumption and easier scale-up/scale-down as compared with other techniques. The membrane module is made by bundling up hundreds to thousands of hollow fiber membranes, and the module has a specific surface area of several to several tens of $m^2$. Thus, this technology designs a number of modules according to a target for water vapor removal and connects the modules.

However, development of high-durability and high chemical-resistance substance as compared with VOCs is needed to apply the membrane treatment method to the presence of VOCs.

BRIEF SUMMARY

The embodiments provide a hollow fiber composite membrane for water vapor separation with high durability and high chemical resistance and a method for manufacturing the same.

According to an embodiment, a hollow fiber composite membrane for water vapor separation comprises a hollow fiber membrane including two or more pores and a coating layer in which an interfacial polymer obtained from interfacial polymerization of water-soluble monomer and an organic monomer is coated on a surface of the hollow fiber membrane, and a chemical resistant substance is introduced in the interfacial polymer.

According to another embodiment, a method for manufacturing a hollow fiber composite membrane for water vapor separation comprises preparing a hollow fiber membrane including two or more pores and forming a coating layer by dispersing a chemical resistant substance in an aqueous solution including a water-soluble monomer and an organic monomer and then coating a surface of the hollow fiber membrane with an interfacial polymer obtained by interfacially polymerizing the water-soluble monomer and the organic monomer included in the aqueous solution.

The hollow fiber composite membrane for water vapor separation and the method for manufacturing the same according to the embodiments may have excellent water resistance and chemical resistance.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Hereinafter, embodiments of the disclosure are described in detail with reference to the accompanying drawings. The same or substantially the same reference denotations are used to refer to the same or substantially the same elements throughout the specification and the drawings. When determined to make the subject matter of the present invention unclear, the detailed of the known art or functions may be skipped. The terms "comprises" and/or "comprising," "has" and/or "having," or "includes" and/or "including" when used in this specification specify the presence of stated features, regions, integers, steps, operations, elements, and/or components, but do not preclude the presence or addition of one or more other features, regions, integers, steps, operations, elements, components, and/or groups thereof. As used herein, the singular forms "a", "an" and "the" are intended to include the plural forms as well, unless the context clearly indicates otherwise.

Such denotations as "first," "second," "A," "B," "(a)," and "(b)," may be used in describing the components of the present invention. These denotations are provided merely to distinguish a component from another, and the essence of the components is not limited by the denotations in light of order or sequence.

In describing the positional relationship between components, when two or more components are described as "connected", "coupled" or "linked", the two or more components may be directly "connected", "coupled" or "linked"", or another component may intervene. Here, the other component may be included in one or more of the two or more components that are "connected", "coupled" or "linked" to each other.

In relation to components, operational methods or manufacturing methods, when A is referred to as being "after," "subsequent to," "next," and "before," A and B may be discontinuous from each other unless mentioned with the term "immediately" or "directly."

When a component is designated with a value or its corresponding information (e.g., level), the value or the corresponding information may be interpreted as including a tolerance that may arise due to various factors (e.g., process factors, internal or external impacts, or noise).

Figure 1:
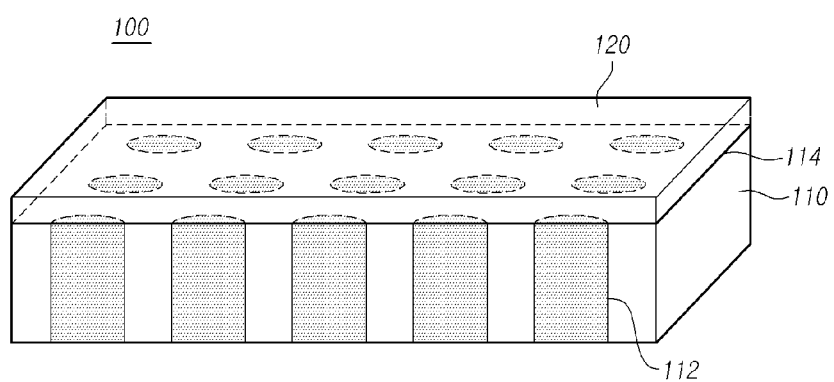
FIG. 1 is a cross-sectional perspective view illustrating a hollow fiber composite membrane for water vapor separation according to an embodiment according to an embodiment.

FIG. 1 is a cross-sectional perspective view illustrating a hollow fiber composite membrane for water vapor separation according to an embodiment according to an embodiment.

Referring to FIG. 1, a hollow fiber composite membrane 100 for water vapor separation according to an embodiment includes a hollow fiber membrane 110 including two or more pores 112 and a coating layer 120 having an interfacial polymer, in which a water-soluble monomer and an organic monomer are interfacially polymerized, coated on a surface 114 of the hollow fiber membrane 110 and having a chemical resistant substance introduced in the interfacial polymer.

The hollow fiber membrane 110 is used as a substrate. The hollow fiber membrane 110 may be a thin film composite membrane (TFC) manufactured using a variety of known polymers. For example, the hollow fiber membrane 110 may be formed of high density polyethylene (HDPE) or polysulfone (PSf).

A low-cost ultrafiltration membrane (UF) is used as the substrate for making a membrane for reducing water vapor, but the ultrafiltration membrane has a large pore size of 10 nm to 100 nm. To separate water vapor, a very small pore size of less than 1 nm or a dense, non-porous membrane is required. Thus, densification for significantly reducing the pore size or removing the pores by coating the surface of the membrane is required to use the UF hollow fiber membrane as a water pre-treatment composite membrane.

Further, the water vapor reduction membrane used in the presence of VOCs requires high durability and chemical properties as compared to VOCs, so that a substance with excellent chemical resistance needs to be added when coating the surface.

The hollow fiber composite membrane 100 for water vapor separation according to an embodiment applies a chemical resistant substance to the surface coating of the hollow fiber membrane 110, thus providing a composite membrane with high chemical resistance as compared with toluene which is VOC.

Coating may be applied on either the outside or inside of the hollow fiber membrane 110 and, in some cases, on both the outside or inside.

The water-soluble monomer may be one or more of diethylenetriamine (DETA), dopamine, piperazine, 1,3,5-benzenetrithiol, benzene-1,3-diamine, 3,5-diaminobenzoic acid, or benzenedithiol.

The organic monomer may be trimesoyl chloride (TMC) or cyanuric chloride.

For example, although DETA and trimesoyl chloride are used as the water-soluble monomer and the organic monomer, respectively, for interfacial polymerization, other monomers may be used to manufacture the composite membrane.

The chemical resistant substance may be zeolite, $SiO_2$, $TiO_2$, or $WO_3$, but is not limited thereto. For example, the chemical resistant substance may be titanosilicate, which is a type of zeolite. Specifically, the titanosilicate may be engelhard titanosilicate-4 (ETS-4).

For example, by applying particles of ETS-4, which is a type of zeolite, to the coating on the surface 114 of the hollow fiber membrane 110, it is possible to provide a composite membrane having higher chemical resistance than toluene, one of the VOCs.

Figure 2:
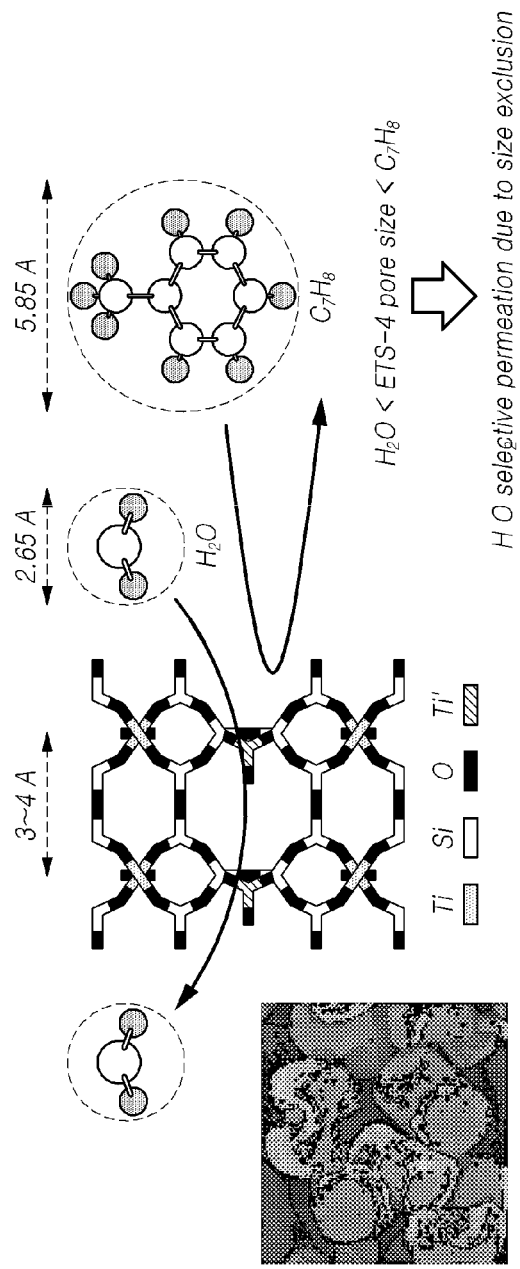
FIG. 2 is a schematic diagram illustrating water-selective permeation of ETS-4 particles.

FIG. 2 is a schematic diagram illustrating water-selective permeation of ETS-4 particles.

Referring to FIG. 2, since the ETS-4 particles are composed only of Ti, Si, and O, they have excellent chemical resistance to organic substances, and only water may be selectively separated from the water/toluene mixed gas by the exclusion effect.

Since the ETS-4 particles are composed only of Ti, Si, and O, they have excellent chemical resistance to organic substances, and their pore size is larger than the kinetic diameter of water and smaller than the kinetic diameter of toluene, so that the size-selective effect and affinity with water are excellent. The pore size of ETS-4 is 0.3 mm to 0.4 nm, and the kinetic diameter of water vapor is 0.265 nm, benzene 0.585 nm, toluene 0.585 nm, and m-xylene 0.68 nm. In other words, since the pore size of ETS-4 is larger than the kinetic diameter of water and smaller than the kinetic diameter of toluene, only water may be allowed to selectively permeate.

Therefore, if the ETS-4 particles are coated on the surface 114 of the hollow fiber membrane 110, only water vapor in the toluene/water mixed gas may be allowed to selectively permeate while having excellent chemical resistance.

Materials with poor chemical resistance may be swelled or softened by chemicals, such as VOCs, leading to more chemical permeation. To enhance chemical resistance, a method for increasing the thickness of a material with weak chemical resistance may also be considered. As the thickness increases, chemical resistance may increase because, e.g., VICS cannot permeate. However, if the thickness increase, the substance that is required to permeate, e.g., water, may not permeate either.

Coating with inorganic nanoparticles, such as ETS-4 with excellent chemical resistance, may prevent, e.g., VOCs from swelling or softening the surface, leading to excellent chemical resistance. In other words, a coating of a hard material acts as a barrier against chemicals, such as VOCs. ETS-4 serves to allow water to pass well while selectively blocking only chemicals, e.g., VOCs. From a planarization point of view, the surface 114 of the separator, such as the hollow fiber membrane 110, needs to have a large specific surface area to meet more water vapor. If ETS-4 is coated on the surface 114 of the hollow fiber membrane 110, the surface roughness is increased by the S-4 particles to enhance water permeance as is described with reference to FIG. 7.

To coat the ETS-4 particles on the surface 114 of the hollow fiber membrane 110, another coating material is required. All methods, such as general solution impregnation method and interfacial polymerization method, are possible.

In this embodiment, there is provided a composite membrane 100 in which the surface 114 of the hollow fiber membrane 110 is coated by the interfacial polymerization method described below with reference to FIG. 3, and ETS-4 particles are introduced in the interfacial polymerization to be included in the composite membrane 100.

However, the surface 114 of the hollow fiber membrane may be coated by a solution impregnation method. For example, it may be prepared by a solution impregnation method in which a polymer (e.g., PVA, PEG, SPEEK, etc.) is dissolved and ETS-4 particles, which are chemical resistant substances, are dispersed in the polymer solution, and the hollow fiber membrane 110 is then supported thereon. Most polymers may be used here as long as they are hydrophilic materials.

Since the composite membrane 100 coated with ETS-4 particles selectively separates only water vapor from the toluene/water mixed gas, it is possible to lower the humidity. Even in the process of recovering VOCs, if the humidity is high, the VOCs may cause a competitive reaction with water vapor or VOCs desorption from the suction agent and the surface 114 of the hollow fiber membrane 110 may occur, thereby reducing the efficiency. If the ETS-4 composite membrane 100 is installed in small and medium-sized workplace painting facilities, it may be possible to stably maintain humidity and increase VOCs removal efficiency.

Hereinafter, in the composite membrane 100 coated with ETS-4 particles, the water-soluble monomer is DETA, and the organic monomer is TMC, for example.

When the concentration of DETA is xw/w %, the TMC concentration may be x/40 to x/3 w/w %, and the concentration of the chemical resistant substance may be x/40 to x/5 w/w %. For example, the DETA concentration may be 0.2 to 3 w/w %, and the TMC concentration may be 0.05 to 1 w/w %.

Specifically, the DETA concentration is 0.2-3 w/w %, preferably 1.5-2.5 w/w %, and most preferably 2 w/w %. The TMC concentration is 0.05 to 1 w/w %, preferably 0.1 to 0.3 w/w %, and most preferably 0.2 w/w %.

The reason why the TMC concentration is lower than the DETA concentration is because the DETA solvent is water soluble and the TMC solvent is hexane, so that TMC is not well soluble in hexane. In the sense of the upper limit, DETA may be difficult to dissolve in water by 3 w/w % or more, and TMC may be difficult to dissolve in hexane by 1 w/w % or more. This is because, in the sense of the lower limit, interfacial polymerization does not occur well when the DETA and TMC concentrations are too low.

The content of ETS-4 particles may be added by up to 0.05-2.0 wt % as compared to DETA monomer, but if the content is too large, the performance is reduced due to agglomeration, so the range of 0.05-0.5 wt % is preferable. Coating may be applied on either the outside or inside of the hollow fiber membrane 110 and, in some cases, on both the outside or inside.

The composite membrane 100 may be manufactured and applied as a membrane module by weaving hundreds to thousands of hollow fiber membranes. These modules have a specific surface area of several to several tens of $m^2$. Thus, it is possible to design a number of modules according to a target for water vapor removal and connect the modules.

Figure 3:
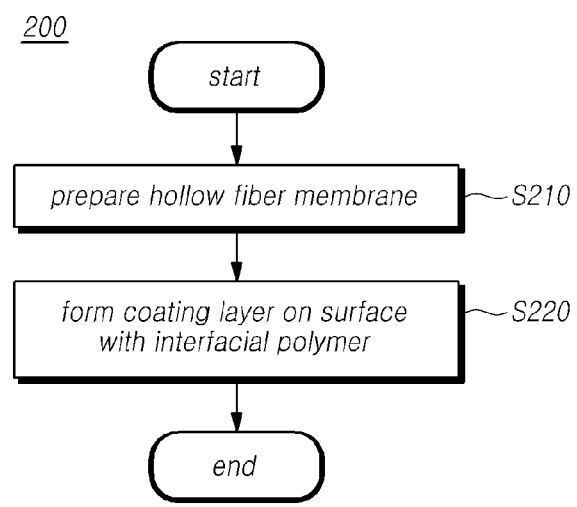
FIG. 3 is a flowchart illustrating a method for manufacturing a hollow fiber composite membrane for water vapor separation according to another embodiment.

FIG. 3 is a flowchart illustrating a method for manufacturing a hollow fiber composite membrane for water vapor separation according to another embodiment.

Referring to FIG. 3, a method 200 for manufacturing a hollow fiber composite membrane for water vapor separation according to another embodiment includes the step S210 of preparing a hollow fiber membrane including two or more pores and the step S220 of forming a coating layer by coating a surface of the hollow fiber membrane with an interfacial polymer obtained by dispersing zeolite in an aqueous solution including a water-soluble monomer and an organic monomer and then interfacially polymerizing the water-soluble monomer and the organic monomer included in the aqueous solution.

The water-soluble monomer may be one or more of diethylenetriamine (DETA), dopamine, piperazine, 1,3,5-benzenetrithiol, benzene-1,3-diamine, 3,5-diaminobenzoic acid, or benzenedithiol.

The organic monomer may be trimesoyl chloride (TMC) or cyanuric chloride.

For example, although DETA and trimesoyl chloride are used as the water-soluble monomer and the organic monomer, respectively, for interfacial polymerization, other monomers may be used to manufacture the composite membrane.

The chemical resistant substance may be zeolite, $SiO_2$, $TiO_2$, or $WO_3$, but is not limited thereto. For example, the chemical resistant substance may be titanosilicate, which is a type of zeolite. Specifically, the titanosilicate may be engelhard titanosilicate-4 (ETS-4).

Hereinafter, in the composite membrane 100 coated with ETS-4 particles, the water-soluble monomer is DETA, and the organic monomer is TMC, for example.

As described above, in this embodiment, there is provided a composite membrane 100 in which the surface 114 of the hollow fiber membrane 110 is coated by the interfacial polymerization method described below with reference to FIG. 3, and ETS-4 particles are introduced in the interfacial polymerization to be included in the composite membrane 100.

When the concentration of DETA is xw/w %, the TMC concentration may be x/40 to x/3 w/w %, and the concentration of the chemical resistant substance may be x/40 to x/5 w/w %. For example, the DETA concentration may be 0.2 to 3 w/w %, and the TMC concentration may be 0.05 to 1 w/w %.

Specifically, the DETA concentration is 0.2-3 w/w %, preferably 1.5-2.5 w/w %, and most preferably 2 w/w %. The TMC concentration is 0.05 to 1 w/w %, preferably 0.1 to 0.3 w/w %, and most preferably 0.2 w/w %.

During interfacial polymerization of DETA and TMC, the interfacial polymerization reaction time may be shortened by heat treatment after impregnation with DETA and TMC. In other words, the reason for heat treatment after impregnation with DETA and TMC during interfacial polymerization of DETA and TMC is that the interfacial polymerization of DETA/TMC proceeds quickly at high temperature. Since there may be monomers that do not react after heat treatment, a washing process with water may be added.

In the following preparation examples, the water-soluble monomer is DETA, the organic monomer is TMC, and the chemical resistant substance is ETS-4, but embodiments of the disclosure are not limited thereto. The manufacturing process of the ETS-4 particles according to preparation example 1 and the characteristics of the prepared ETS-4 particles are described in detail with reference to FIGS. 4 to 6.

Figure 4:
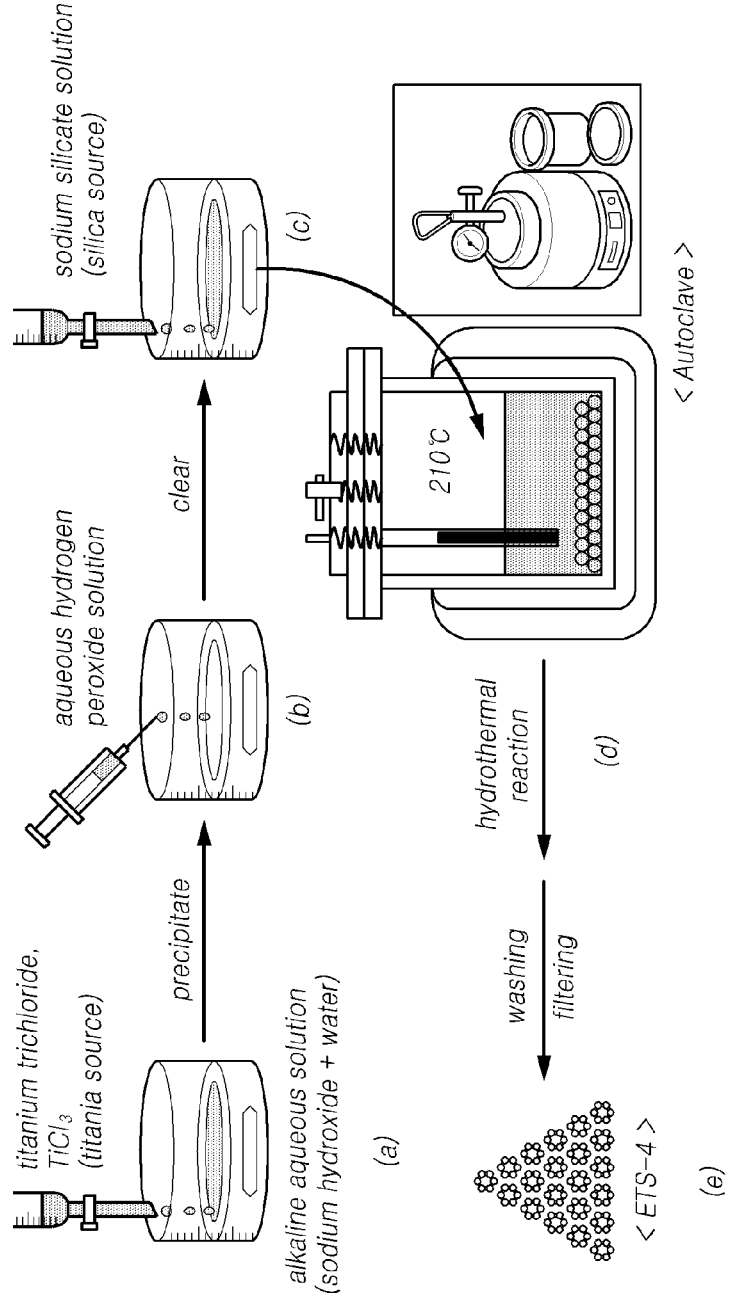
FIG. 4 illustrates a process for preparing ETS-4 particles according to preparation example 1.
Figure 5:
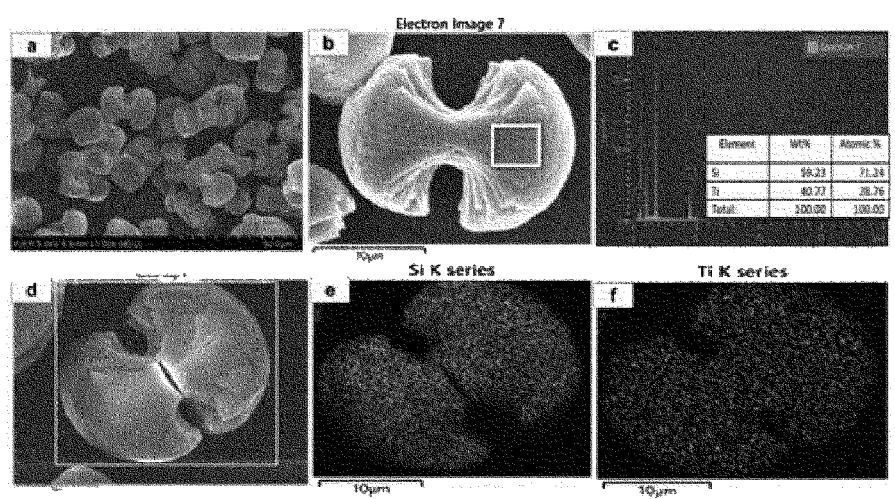
FIG. 5 illustrates an FE-SEM image and elemental analysis of ETS-4 particles prepared by the ETS-4 particle preparation process of FIG. 4.
Figure 6:
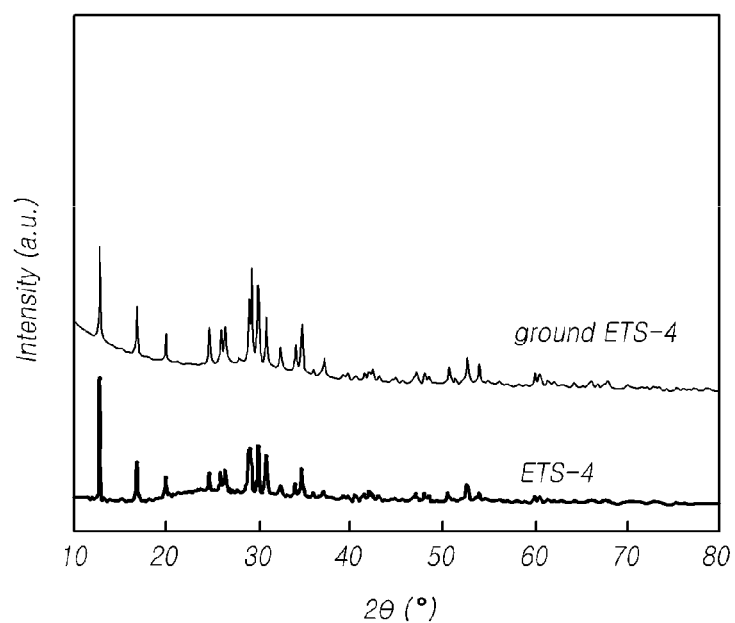
FIG. 6 illustrates an XRD pattern of ETS-4 particles prepared according to preparation example 1.

FIG. 4 illustrates a process for preparing ETS-4 particles according to preparation example 1. FIG. 5 illustrates an FE-SEM image and elemental analysis of ETS-4 particles prepared by the ETS-4 particle preparation process of FIG. 4. FIG. 6 illustrates an XRD pattern of ETS-4 particles prepared according to preparation example 1.

[Preparation Example 1] Preparation Example of ETS-4

Referring to FIG. 4, if sodium hydroxide is dissolved in distilled water, and then, titanium trichloride is slowly dripped, a white precipitate is generated (see (a) of FIG. 4). Then, if hydrogen peroxide is added to the solution and stirred for 30 minutes, the color changes to bright yellow (see (b) of FIG. 4). Thereafter, sodium silicate solution is added and stirred for 30 minutes (see (c) of FIG. 4). The composition of the final solution is $18NaOH: 675H_2O: 0.5TiO_2:5H_2O_2:10SiO_2$. The solution is placed in an autoclave coated with Teflon inside the container and subjected to a hydrothermal reaction in an oven set at 210° C. for 2 days (see (d) of FIG. 4).

After the hydrothermal reaction is completed, it is washed several times with distilled water, and the generated particles are filtered with filter paper to obtain ETS-4 (see (e) of FIG. 4).

Since the generated ETS-4 particles have a size of several to several tens of um, it was pulverized by an attrition mill to coat the composite membrane 100, and the pulverized particle size was about 95 nm.

Referring to FIG. 5, it was identified that the prepared ETS-4 particles had a dumbbell-like shape morphology with a fine needle crystal structure from FE-SEM image analysis. It was identified that the Si/Ti ratio was 2.9 through elemental analysis, and since the ratio was typical of ETS-4, it could be identified that the particles were ETS-4 particles.

Referring to FIG. 6, the crystal structure of the ETS-4 particles was identified through XRD analysis. The XRD peaks of the ETS-4 particle exhibit characteristic diffraction angles (2θ) of 12.7, 29.9, and 30.7 degrees, and the particles prepared in the disclosure also showed the same diffraction angles. Further, it was also identified that the small pulverized particles (ground ETS-4) also showed an ETS-4 structure without a change in the crystal structure.

The manufacturing process of an ETS-4 composite membrane according to preparation example 2 and the characteristics of the prepared ETS-4 composite membrane are described in detail with reference to FIGS. 6 to 11.

Figure 7:
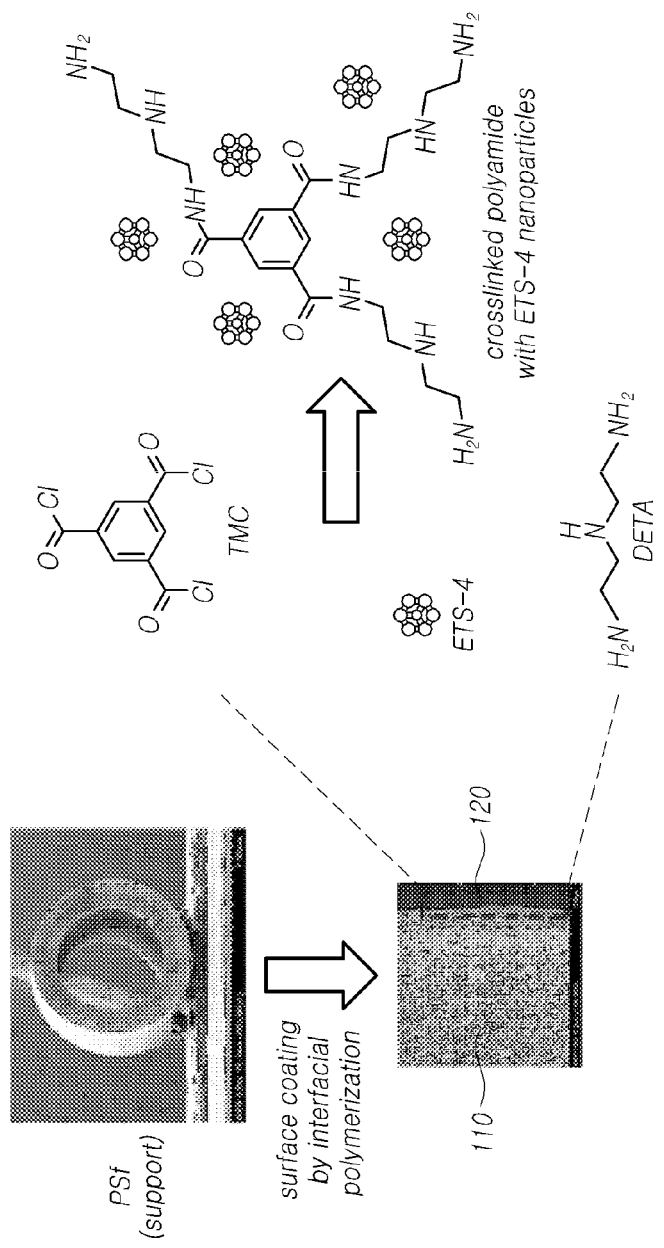
FIG. 7 is a schematic diagram illustrating a process for manufacturing a composite membrane containing ETS-4 particles according to preparation example 2.
Figure 8:
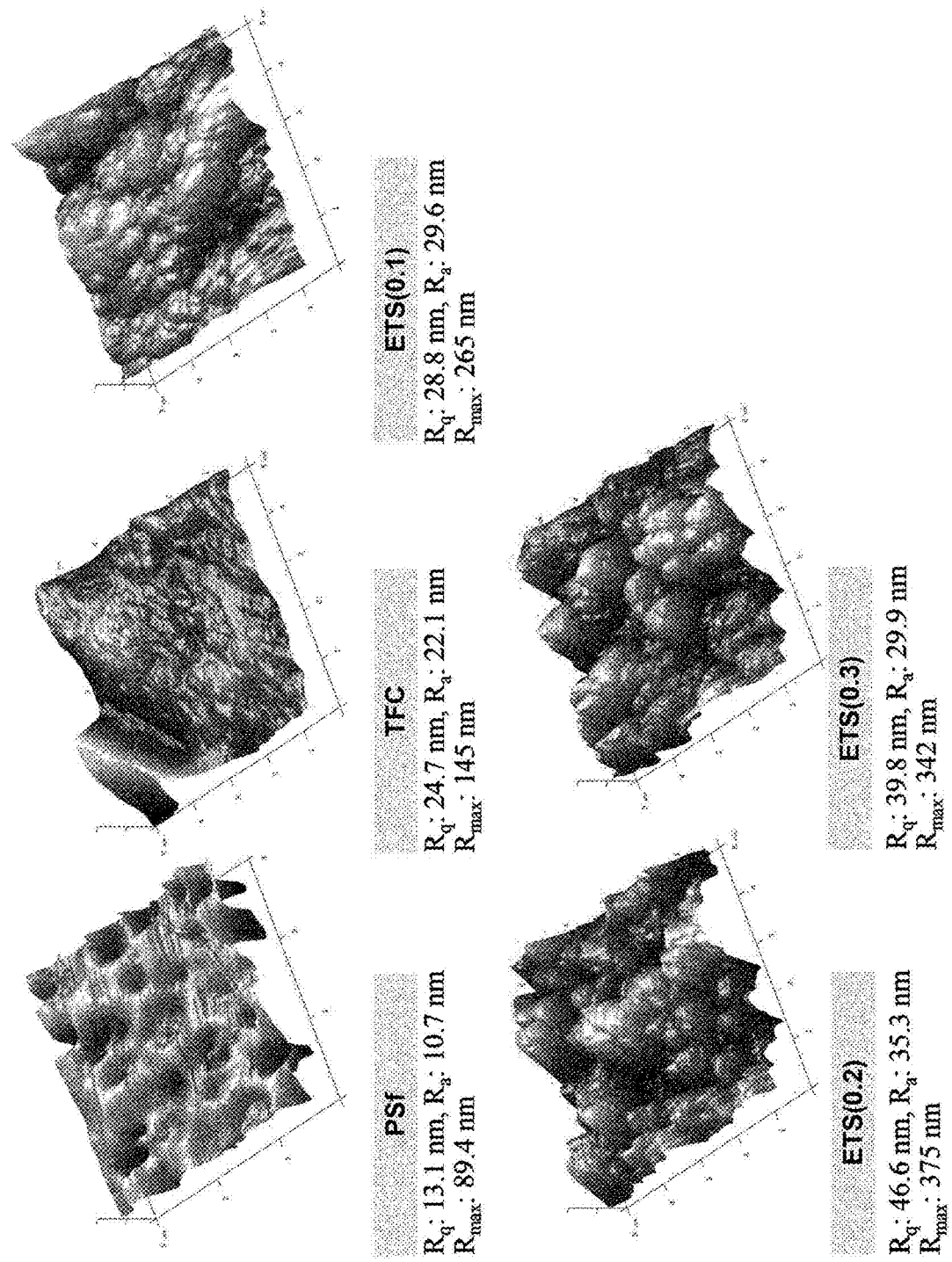
FIG. 8 illustrates an AFM surface image and roughness of a composite membrane manufactured by the composite membrane manufacturing process of FIG. 7.
Figure 9:
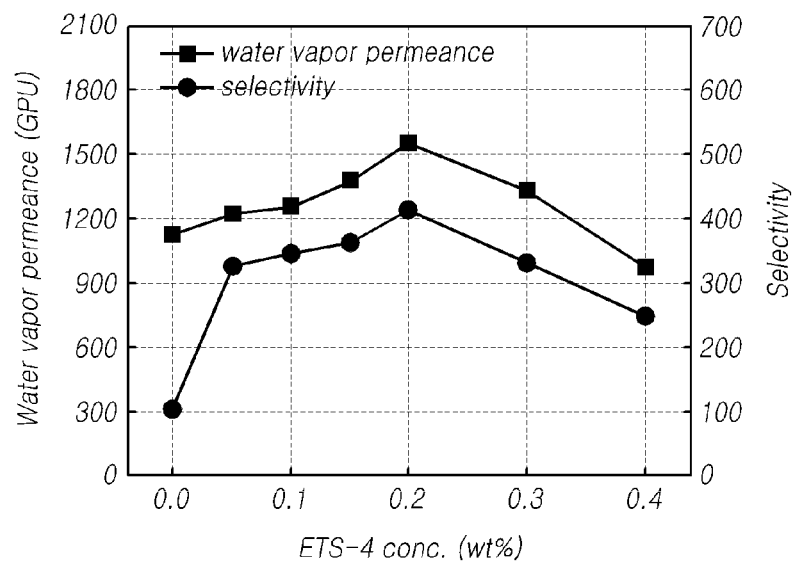
FIG. 9 illustrates the water vapor permeance of a composite membrane according to the concentration of ETS-4.
Figure 10:
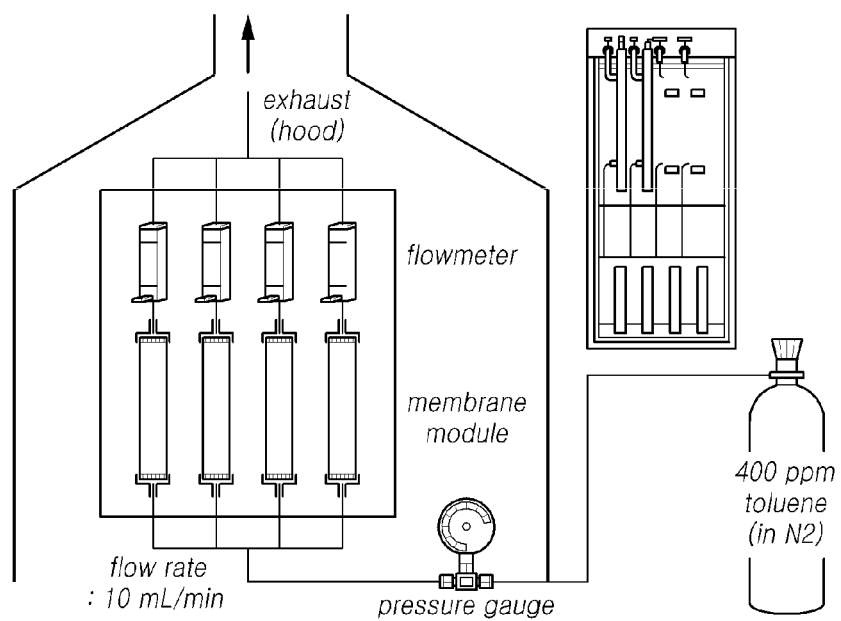
FIG. 10 is a concept view illustrating a toluene long-term durability evaluation device for an ETS-4 (0.2) module.
Figure 11:
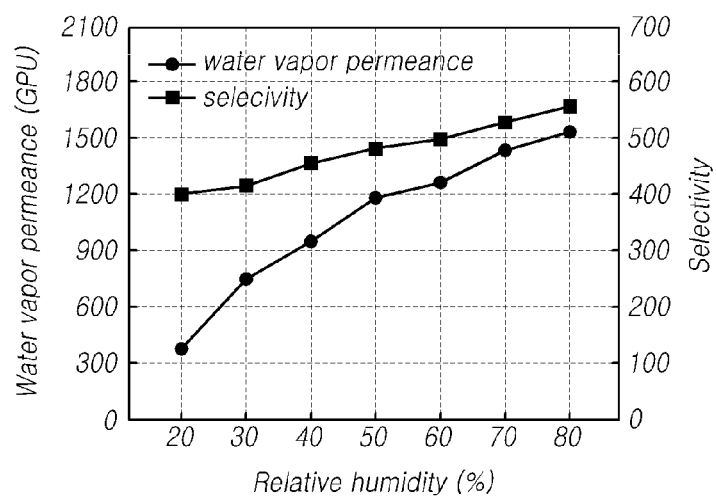
FIG. 11 illustrates the water vapor permeance of an ETS (0.2) membrane before (left) and after (right) long-term durability test against toluene.
Figure 11:
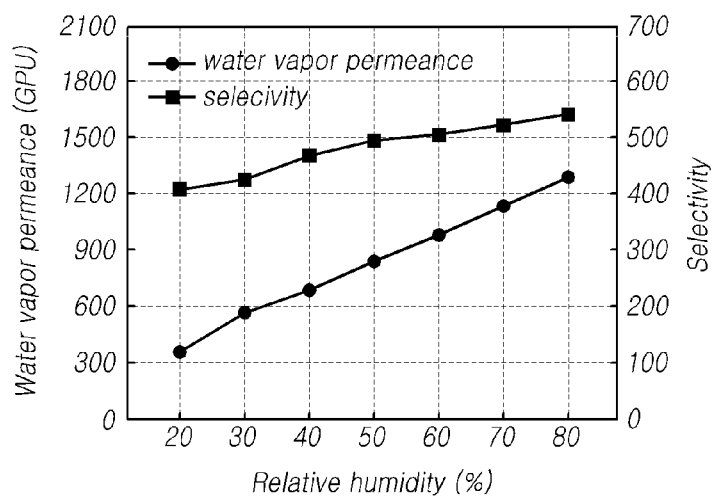
Figure 12:
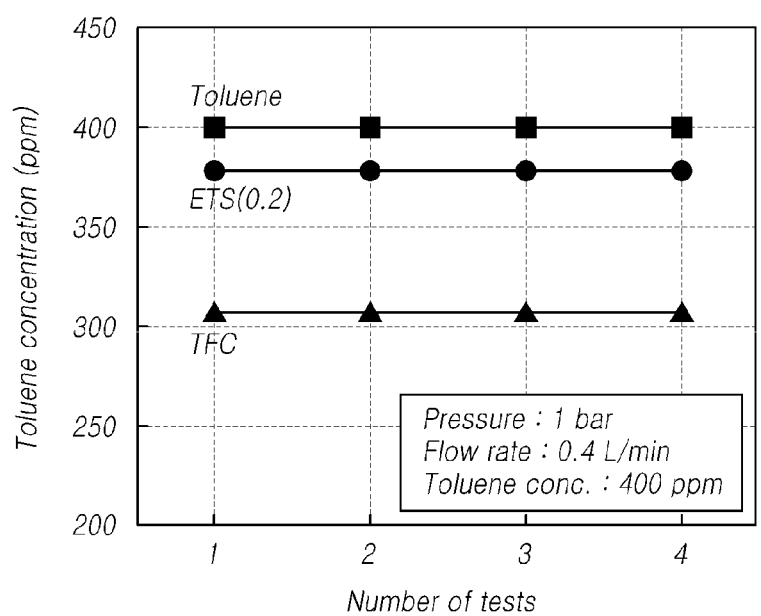
FIG. 12 illustrates the toluene permeation performance of an ETS-4 (0.2) composite membrane.

FIG. 7 is a schematic diagram illustrating a process for manufacturing a composite membrane containing ETS-4 particles according to preparation example 2. FIG. 8 illustrates an AFM surface image and roughness of a composite membrane manufactured by the composite membrane manufacturing process of FIG. 7. FIG. 9 illustrates the water vapor permeance of a composite membrane according to the concentration of ETS-4. FIG. 10 is a concept view illustrating a toluene long-term durability evaluation device for an ETS-4 (0.2) module. FIG. 11 illustrates the water vapor permeance of an ETS (0.2) membrane before (left) and after (right) long-term durability test against toluene. FIG. 12 illustrates the toluene permeation performance of an ETS-4 (0.2) composite membrane.

[Embodiment 2] ETS-4 Composite Membrane

Referring to FIG. 7, the outer surface of a polysulfone (PSf) hollow fiber membrane substrate 310 was coated by DETA/TMC interfacial polymerization, and a coating layer 320 was prepared by dispersing the ETS-4 particles pulverized in interfacial polymerization to finally manufacturing a composite membrane 300 including the ETS-4 particles.

The composition ratio of the composite membrane is shown in Table 1 below. The weight ratio of ETS-4 particles is the weight ratio relative to the DETA monomer. Hereinafter, when the concentration of ETS-4 particles is x, it is expressed as ETS(x). For example, if the concentration of ETS-4 particles is 0.05 w/w %, it is expressed as ETS(0.05).

TABLE 1

| membrane | DETA concentration (w/w %) | TMC concentration (w/w %) | ETS-4 concentration (w/w %) |
|---|---|---|---|
| TFC | 2 | 0.2 | 0 |
| ETS(0.05) | 2 | 0.2 | 0.05 |
| ETS(0.1) | 2 | 0.2 | 0.1 |
| ETS(0.15) | 2 | 0.2 | 0.15 |
| ETS(0.2) | 2 | 0.2 | 0.2 |
| ETS(0.3) | 2 | 0.2 | 0.3 |
| ETS(0.4) | 2 | 0.2 | 0.4 |

Referring to FIG. 8, the surface roughness of the prepared composite membrane was measured by AFM. The average roughness (Ra) of the PSf membrane which is the substrate was 10.7 nm, and the roughness of the TMC membrane was 22.1 nm.

If the ETS-4 particles were added, the roughness gradually increased, and the ETS(0.2) composite membrane 300 in which 0.2 wt % of ETS-4 particles relative to the DETA monomer was added showed the highest roughness of 35.3 nm. However, the roughness of the ETS(0.3) composite membrane 300 which added 0.3 wt % was reduced to 29.9 nm, which is thought to be attributed to agglomeration due to too much content of ETS-4 particles.

Referring to FIG. 9, the water vapor permeance and selectivity of the composite membranes prepared with various ETS-4 contents were measured at a temperature of 25 degrees, relative humidity of 60%, a pressure of 3 bar, and a flow rate of 1 L/min. While the ETS-4 content was increased to 0.2 wt %, the water vapor permeance and selectivity of the membrane gradually increased, and if added more, the values rather decreased. As described above, it is considered that permeance and selectivity as well as surface roughness decreased because agglomeration of ETS-4 particles occurred. The ETS(0.2) composite membrane which added 0.2 wt % of ETS-4 showed the highest water vapor permeance (1544 GPU) and selectivity (413).

Referring to FIG. 10, the toluene long-term durability of the ETS(0.2) composite membrane was evaluated. After preparing a cylindrical module composed of several strands of ETS(0.2) composite membrane, the initial water vapor permeance and selectivity of the module were measured at a temperature of 25° C. and a relative humidity of 20-80%.

The measured module was mounted on a long-term durability evaluation device as shown in FIG. 10, and toluene/nitrogen (toluene 400 ppm) mixed gas was injected at 10 mL/min into the module (to the outer surface of the composite membrane) and was stored for one month. After one month, the long-term durability of the ETS(0.2) composite membrane was evaluated by measuring the water vapor permeance and selectivity of the module again under the same conditions.

The water vapor permeance and selectivity of the composite membrane before and after long-term durability evaluation showed no or little difference in all the relative humidity ranges, and it was identified therefrom that the ETS-4 composite membrane had high chemical resistance and durability as compared to toluene.

Referring to FIG. 11, the toluene permeance of the ETS(0.2) composite membrane module was evaluated. Toluene/nitrogen (toluene 400 ppm) mixed gas was flowed at 0.4 L/min, 1 bar pressure was applied thereto, and the toluene permeance was measured by gas chromatography (GC). Agilent's HP6890 model was used as the GC device, and an FID detector was installed inside. As a result, 306.5 ppm of toluene was detected in the TFC membrane without ETS-4 nanoparticles. In other words, 93.5 ppm of toluene permeated the membrane. In contrast, in the ETS(0.2) composite membrane, 379 ppm of toluene was detected, meaning that only 21 ppm of toluene permeated the membrane. In other words, it could be identified that the toluene permeation prevention performance was enhanced due to the selective permeation performance of the ETS-4 particles.

The hollow fiber composite membrane for water vapor separation and the method for manufacturing the same according to embodiments have been described above.

The hollow fiber composite membrane 100 for water vapor separation according to embodiments selectively separates only water from the exhaust gas containing VOCs represented by toluene, and has high chemical resistance and durability as compared to toluene.

Further, the hollow fiber composite membrane 100 for water vapor separation may be used for various purposes as follows.

Since the hollow fiber composite membrane 100 for water vapor separation, which has excellent chemical resistance as compared to VOCs, such as toluene, may recover water vapor, it may be used in a building air conditioner or an indoor dehumidifier to lower the indoor relative humidity to an appropriate level to realize a comfortable indoor air environment.

Because the dressing room is a closed space, ventilation is difficult, and mold may grow on the corners of walls and ceilings and clothes due to the humid air. To prevent this, a dehumidification process is essential, and if the hollow fiber composite membrane 100 for water vapor separation is applied to such a dressing room, and dehumidification is performed with little energy, the dressing room may be comfortably maintained without burdening the electricity bill.

In the arsenal, an air conditioning and dehumidification system is essential to prevent condensation inside and maintain optimum humidity (50 to 60%). The arsenal may be maintained at the optimal humidity by controlling the amount of dehumidification by adjusting the vacuum pressure strength after applying the hollow fiber composite membrane 100 for water vapor separation to the arsenal.

Appropriate humidity conditions in a general clean room are 50-60%, and dry dehumidification (silica gel rotor) is used when it is less than 40%, and cooling dehumidification (cooling coil) is used when it is more than 50%, but these methods consume much energy as described above. By applying the hollow fiber composite membrane 100 for water vapor separation to the clean room process, it is possible to reduce the cost of the existing clean room dehumidification process.

The hollow fiber composite membrane 100 for water vapor separation is also applicable to pharmaceutical storage, agricultural products/food storage, and workplaces requiring humidity management (computer room, machine facility room, broadcasting room, warehouse, etc.).

As described above, the hollow fiber composite membrane 100 for water vapor separation may be used in fields that require dehumidification, and is capable of dehumidification even where VOCs are included.

Further, it may be used as a dehumidifying device, such as a painting factory that emits VOCs.

The water condensed through the hollow fiber composite membrane 100 for water vapor separation is as clean as water obtained through NF membrane, so it is expected to be reused for industrial water as well as in high value-added industries.

The above-described embodiments are merely examples, and it will be appreciated by one of ordinary skill in the art various changes may be made thereto without departing from the scope of the present invention. Accordingly, the embodiments set forth herein are provided for illustrative purposes, but not to limit the scope of the present invention, and should be appreciated that the scope of the present invention is not limited by the embodiments. The scope of the present invention should be construed by the following claims, and all technical spirits within equivalents thereof should be interpreted to belong to the scope of the present invention.

What is claimed is:

1. A hollow fiber composite membrane for water vapor separation, comprising:

a hollow fiber membrane including two or more pores; and a coating layer in which an interfacial polymer obtained from the interfacial polymerization of a water-soluble monomer and an organic monomer is coated on a surface of the hollow fiber membrane, and a chemical resistant substance is introduced in the interfacial polymer;

wherein the water-soluble monomer is diethylenetriamine (DETA), the organic monomer is trimesoyl chloride (TMC), and the chemical resistant substance is Engelhard titanosilicate-4 (ETS-4); and wherein the concentration of the DETA is 0.2 to 3 w/w %, the concentration of the TMC is 0.05 to 1 w/w %, and the concentration of the Engelhard titanosilicate-4 is 0.15 to 0.2 w/w %.

2. A method for manufacturing a hollow fiber composite membrane for water vapor separation, the method comprising:

preparing a hollow fiber membrane including two or more pores; and forming a coating layer by dispersing a chemical resistant substance in an aqueous solution including a water-soluble monomer and an organic monomer and then coating a surface of the hollow fiber membrane with an interfacial polymer obtained by interfacially polymerizing the water-soluble monomer and the organic monomer included in the aqueous solution; wherein the water-soluble monomer is diethylenetriamine (DETA), the organic monomer is trimesoyl chloride (TMC), and the chemical resistant substance is Engelhard titanosilicate-4 (ETS-4); and wherein the concentration of the DETA is 0.2 to 3 w/w %, the concentration of the TMC is 0.05 to 1 w/w %, and the concentration of the Engelhard titanosilicate-4 is 0.15 to 0.2 w/w %.

* * * * *